(12) United States Patent
Im et al.

(10) Patent No.: US 11,977,973 B2
(45) Date of Patent: May 7, 2024

(54) NEURON CIRCUIT AND OPERATING METHOD THEREOF

(71) Applicants: ELECTRONICS AND TELECOMMUNICATIONS RESEARCH INSTITUTE, Daejeon (KR); Konkuk University Industrial Cooperation Corp, Seoul (KR)

(72) Inventors: Jong Pil Im, Daejeon (KR); Bae Ho Park, Seoul (KR); Jeong Hun Kim, Daejeon (KR); Seungeon Moon, Daejeon (KR); Chansoo Yoon, Busan (KR); Jaewoo Lee, Sejong-si (KR); Solyee Im, Daejeon (KR)

(73) Assignees: Electronics and Telecommunications Research Institute, Daejeon (KR); Konkuk University Industrial Cooperation Corp, Seoul (KR)

( * ) Notice: Subject to any disclaimer, the term of this patent is extended or adjusted under 35 U.S.C. 154(b) by 1225 days.

(21) Appl. No.: 16/669,471

(22) Filed: Oct. 30, 2019

(65) Prior Publication Data
US 2020/0175359 A1 Jun. 4, 2020

(30) Foreign Application Priority Data

Nov. 29, 2018 (KR) .......................... 10-2018-0150954
Sep. 27, 2019 (KR) .......................... 10-2019-0120055

(51) Int. Cl.
*G06N 3/065* (2023.01)
*G06N 3/049* (2023.01)

(52) U.S. Cl.
CPC ............. *G06N 3/065* (2023.01); *G06N 3/049* (2013.01)

(58) Field of Classification Search
CPC ......... G06N 3/049; G06N 3/065; G06N 3/088
See application file for complete search history.

(56) References Cited

U.S. PATENT DOCUMENTS 5,264,734 A * 11/1993 Holler ................... G06N 3/065
706/34
9,805,770 B1 * 10/2017 Merced Grafals ..........................
G11C 13/0097
(Continued)

FOREIGN PATENT DOCUMENTS

KR           101918102 B1      2/2019

OTHER PUBLICATIONS

Witt, "Switched Capacitor Voltage Regulator Provides Current Gain" Feb. 1999, Linear Technology Magazine, pp. 28-29 (Year: 1999).*

(Continued)

*Primary Examiner* — James D. Rutten
(74) *Attorney, Agent, or Firm* — Rabin & Berdo, P.C.

(57) ABSTRACT

A neuron circuit and an operating method thereof are disclosed. The neuron circuit may include an input unit to which an input pulse is applied, a bipolar memristor configured to have one end connected to one end of the input unit, a first capacitor configured to be connected between the one end of the bipolar memristor and a ground, a first diode configured to have an anode connected to the one end of the bipolar component, a second capacitor configured to have one end connected to a cathode of the first diode, a first switch configured to be connected between the one end of the second capacitor and the ground, and a second switch configured to be connected between the anode of the first diode and the other end of the second capacitor.

17 Claims, 5 Drawing Sheets

(56) References Cited

U.S. PATENT DOCUMENTS

| | | | |
|---|---|---|---|
| 2012/0011090 A1* | 1/2012 | Tang | G06N 3/088 706/33 |
| 2012/0153249 A1* | 6/2012 | Zhang | H10N 70/021 257/E47.001 |
| 2012/0176831 A1* | 7/2012 | Xiao | H10N 70/8833 257/4 |
| 2016/0110644 A1 | 4/2016 | Huang et al. | |
| 2017/0083810 A1* | 3/2017 | Ielmini | G06N 3/049 |
| 2018/0211165 A1 | 7/2018 | Oh et al. | |
| 2018/0225563 A1 | 8/2018 | Kim et al. | |

OTHER PUBLICATIONS

O. Keiser, P. K. Steimer and J. W. Kolar, "High power resonant Switched-Capacitor step-down converter," 2008 IEEE Power Electronics Specialists Conference, Rhodes, Greece, 2008, pp. 2772-2777, doi: 10.1109/PESC.2008.4592365. (Year: 2008).*

I. Vourkas and G. C. Sirakoulis, "Emerging Memristor-Based Logic Circuit Design Approaches: A Review," in IEEE Circuits and Systems Magazine, vol. 16, No. 3, pp. 15-30, thirdquarter 2016, doi: 10.1109/MCAS.2016.2583673. (Year: 2016).*

Wang R, Shi T, Zhang X, Wang W, Wei J, Lu J, Zhao X, Wu Z, Cao R, Long S, Liu Q, Liu M. Bipolar Analog Memristors as Artificial Synapses for Neuromorphic Computing. Materials (Basel). Oct. 2, 20186;11(11):2102. doi: 10.3390/ma11112102. PMID: 30373122; PMCID: PMC6266336. (Year: 2018).*

Bruce Graham, "Basics of Computational Neuroscience: Neurons and Synapses to Networks", 5th Baltic-Nordic School on Neuroinformatics, Kaunas, 2017, pp. 1-48.

Elisabetta Chicca et al., "A Vlsi recurrent network of integrate-and-fire neurons connected by plastic synapses with long-term memory", IEEE Transactions on Neural Networks, vol. 14, No. 5, Sep. 2003, pp. 1297-1307.

Matthew D. Pickett et al., "A scalable neuristor built with Mott memristors", Nature Materials, Letters, Dec. 16, 2012, pp. 1-4.

Kumeng Zhang et al., "An Artificial Neuron Based on a Threshold Switching Memristor", IEEE Electron Device Letters, vol. 39, No. 2, Feb. 2018, pp. 308-311.

Al-Shedivat, Maruan, et al. "Memristors empower spiking neurons with stochasticity". IEEE journal on Emerging and selected topics in circuits and systems 5.2. 2015.

Biolek, Dalibor, Massimiliano Di Ventra, and Yuriy V. Pershin. "Reliable SPICE simulations of memristors. memcapacitors and meminductors". arXiv preprint arXiv:1307.2717. 2013.

Naous, Rawan, et al. "Memristor-based neural networks: Synaptic versus neuronal stochasticity". Aip Advances 6.11. 2016.

* cited by examiner

NEURON CIRCUIT AND OPERATING METHOD THEREOF

CROSS-REFERENCE TO RELATED APPLICATION

This application claims priority to and the benefit of Korean Patent Application Nos. 10-2018-0150954 and 10-2019-0120055 filed in the Korean Intellectual Property Office on Nov. 29, 2018 and Sep. 27, 2019, respectively, the entire contents of which are incorporated herein by reference.

BACKGROUND OF THE INVENTION

(a) Field of the Invention

The present invention relates to a neuron circuit and an operating method thereof.

(b) Description of the Related Art

In neuromorphic computing, a memristor is an electronic component that can process electrical signals by modeling the characteristics of synapses and neurons. Neurons are nerve cells that recognize and process information acquired through a body's sense organs and command locomotive organs. Synapses play a role in changing their connection strength between two neurons.

Neuromorphic circuits that mimic the human brain are largely composed of synapses and neurons, and research on neuromorphic circuits is underway around the world. Synapses are implemented through various memristors, which are arranged in an array. By additionally configuring the input and output neurons, a neuromorphic circuit is implemented. This allows the basic functions (i.e. memory, association, etc.) to mimic the functions of the human brain.

Memristor is a compound word of memory and resistor. A memristor is a device having resistance characteristics, wherein the resistance value is not constant, and the resistance value changes according to a specific voltage pulse applied across the memristor. The memristor acts as a memory that stores the resistance value for a certain time. Synapses are typically implemented through memristors. In order to realize the most popular I&F (Integration and Fire) function, neurons are implemented with a combination of resistors, capacitors, and memristor elements.

Neuron circuits are circuits that model the function of neurons. A recent paper (An Artificial Neuron Based on a Threshold Switching Memristor, IEEE ELECTRON DEVICE LETTERS, VOL. 39, NO. 2, FEBRUARY 2018) has proposed a neuron circuit using threshold switching memristors (TSM). In this paper, a neuron circuit consists of a TSM, a capacitor, an input resistor, and an output resistor. Here, before the voltage applied to both ends of the TSM becomes Vth2 (1 V), the current increases little by little on a log scale, so that the resistance value is almost unchanged. However, when the voltage exceeds Vth2, the current rapidly increases and the resistance value decreases. In the state where the resistance value of the TSM is small, the current and resistance values remain constant even when the voltage drops. When the voltage reaches Vth1 (0.2 V), the current decreases significantly and the resistance value increases significantly. This TSM has characteristics of a unipolar memristor. When a neuron circuit is configured using such a TSM, it is necessary to reset the neurons (non-fired neurons) that do not output spikes. Here, the reset of a neuron means discharging the charged capacitor and initializing the TSM so that all neurons can behave identically in a next process.

The reset method of the neurons presented in the paper can be applied only to neuron circuits with unipolar memristors, and cannot be applied to neuron circuits with various bipolar memristors currently being researched and developed.

SUMMARY OF THE INVENTION

The present invention provides a neuron circuit to which a bipolar memristor is applied, and an operating method thereof.

According to an exemplary embodiment of the present invention, a neuron circuit is provided. The neuron circuit may include an input unit to which an input pulse is applied, a bipolar memristor configured to have one end connected to one end of the input unit, a first capacitor configured to be connected between the one end of the bipolar memristor and a ground, a first diode configured to have an anode connected to the one end of the bipolar component, a second capacitor configured to have one end connected to a cathode of the first diode, a first switch configured to be connected between the one end of the second capacitor and the ground, and a second switch configured to be connected between the anode of the first diode and the other end of the second capacitor.

The neuron circuit may further include a second diode configured to have an anode and a cathode connected between the other end of the second capacitor and the ground, respectively.

The neuron circuit may further include a third switch configured to be connected in parallel to both ends of the first capacitor.

The neuron circuit may further include a third diode configured to have an anode and a cathode connected to the one end of the bipolar memristor and the one end of the first capacitor, respectively.

The first switch and the second switch may be turned on in a reset operation of the neuron circuit.

A negative voltage may be applied to the bipolar memristor in the reset operation.

The first to third switches may be turned off before the neuron circuit is fired.

The first capacitor and the second capacitor may be charged by the input pulse, and a negative voltage may be applied to the bipolar memristor by turning on the first and second switches in a reset operation of the neuron circuit.

The bipolar memristor may have a positive threshold voltage and a negative threshold voltage.

According to another exemplary embodiment of the present invention, an operating method of a neuron circuit including a bipolar memristor is provided. The operating method may include providing a charging voltage of a first capacitor to the bipolar memristor by charging the first capacitor connected to one end of the bipolar memristor, providing a voltage at one end of a second capacitor to the bipolar memristor by charging the second capacitor having one end connected to the one end of the bipolar memristor, and providing a voltage at the other end of the second capacitor to the bipolar memristor in a reset operation.

The providing of the voltage at the other end of the second capacitor may include turning on a first switch connected between the one end of the second capacitor and a ground, and turning on a second switch connected between the other end of the second capacitor and the one end of the bipolar memristor.

The operating method may further include discharging a voltage charged in the first capacitor by turning on a first switch connected in parallel to the first capacitor in the reset operation.

A voltage at the one end of the second capacitor may be a positive voltage and a voltage at the other end of the second capacitor may be a negative voltage.

The bipolar memristor may have a positive threshold voltage and a negative threshold voltage.

According to another exemplary embodiment of the present invention, a neuron circuit system is provided. The neuron circuit system may include a first neuron circuit configured to output a first output voltage upon firing and a second neuron circuit configured to receive feedback from the first output voltage and perform a reset operation. The second neuron circuit may include a bipolar memristor, a first capacitor configured to be connected to one end of the bipolar memristor and charged by an input pulse, a second capacitor configured to have one end connected to the one end of the bipolar memristor and be charged by the input pulse, a first switch configured to be connected between one end of the second capacitor and a ground and be turned on by the first output voltage, and a second switch configured to be connected between the one end of the bipolar memristor and the other end of the second capacitor and be turned on by the first output voltage.

In the reset operation, the first and second switches may be turned on, and the second capacitor may provide a negative voltage to the bipolar memristor.

The second neuron circuit may further include a third switch connected in parallel to the first capacitor and turned on by the first output voltage.

The second neuron circuit may further include a first diode configured to have an anode connected to the one end of the bipolar memristor and a cathode connected to the one end of the second capacitor, and a second diode configured to have an anode connected to the other end of the second capacitor and a cathode connected to the ground.

The neuron circuit according to the exemplary embodiment of the present invention may perform a reset operation through a structure in which a negative threshold voltage may be applied to the bipolar memristor.

DETAILED DESCRIPTION OF THE EMBODIMENTS

Figure 1:
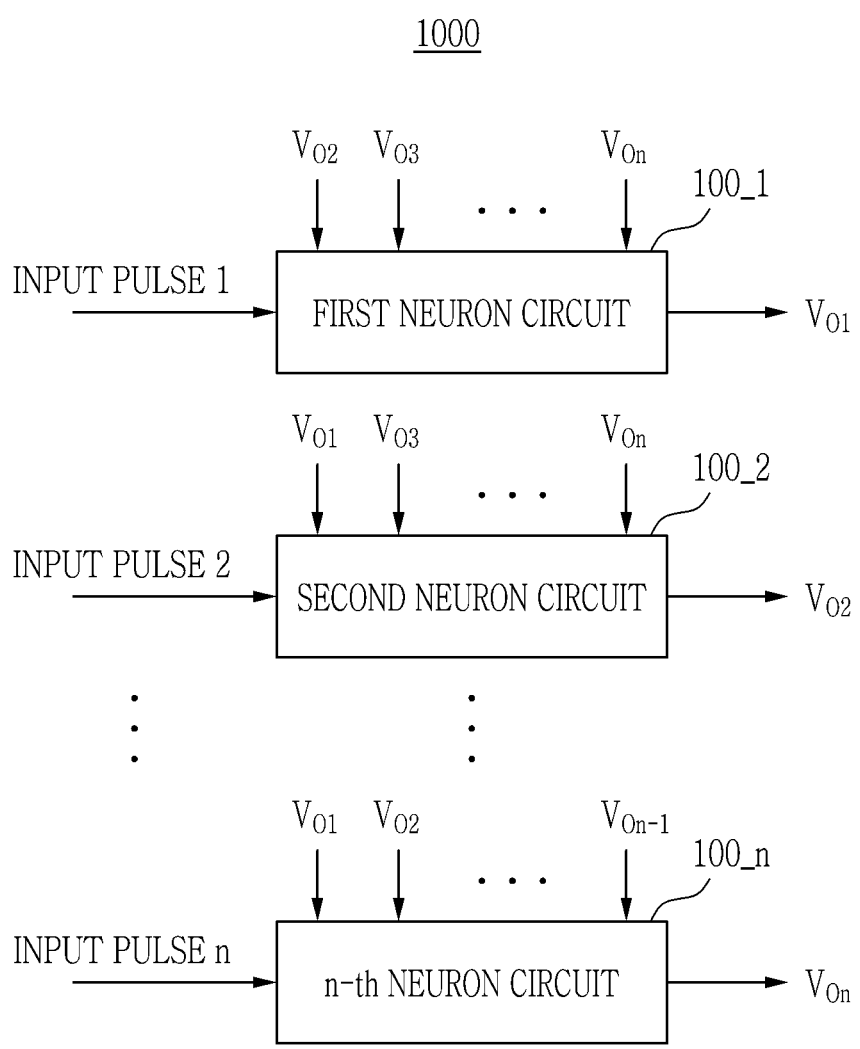
FIG. 1 is a diagram showing a neuron circuit system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. When it is described that an element is "connected" to another element, the element may be "directly connected" to the other element or "electrically connected" to the other element through a third element. In addition, unless explicitly described to the contrary, the word "comprise" and variations such as "comprises" or "comprising" will be understood to imply the inclusion of stated elements but not the exclusion of any other elements. Unless explicitly described to the contrary, the word "include" and variations such as "includes" or "including" will be understood to imply the inclusion of stated elements but not the exclusion of any other elements.

FIG. 1 is a diagram showing a neuron circuit system according to an exemplary embodiment of the present invention.

As shown in FIG. 1, the neuron circuit system 1000 according to an exemplary embodiment of the present invention includes a plurality of neuron circuits 100_1 to 100_$n$.

Each of the plurality of neuron circuits 100_1 to 100_$n$ receives an input pulse and outputs output voltages Vo1 to Von through an internal integration and fire (I&F) operation. When the i-th neuron circuit 100_$i$ is fired among the plurality of neuron circuits 100_1 to 100_$n$, the i-th neuron circuit 100_$i$ outputs an output voltage Voi having a spike output. Meanwhile, each of the plurality of input pulses (input pulse 1 to input pulse n) has a pulse voltage according to the neuron circuit to be fired, and is set by a synaptic circuit (not shown) located in front of the neuron circuit. The plurality of input pulse values set by the synaptic circuit can be known to those skilled in the art to which the present invention pertains, and thus a detailed description thereof will be omitted. For example, when the i-th neuron circuit 100_$i$ is fired, an input pulse may be applied to the input pulse i.

Each of the plurality of neuron circuits 100_1 to 100_$n$ receives feedback from the output voltages of the other neuron circuits other than itself, and performs an automatic reset operation by the feedback output voltages. For example, the first neuron circuit 100_1 receives feedback of the remaining output voltages VO2, VO3, . . . , VOn and performs an automatic reset operation based on the feedback output voltages VO2, VO3, . . . , VOn. That is, the first neuron circuit 100_1 performs a reset operation when at least one neuron circuit among the remaining neuron circuits 100_2, 100_3, . . . , 100_$n$ is fired. Meanwhile, for convenience of description, in FIG. 1, although the plurality of neuron circuits 100_1 to 100_$n$ respectively indicate that the output voltages of the neuron circuits other than its own are fed back, the plurality of neuron circuits 100_1 to 100_$n$ can receive all the output voltages of the plurality of neuron circuits 100_1 to 100_$n$. In this case, the fired neuron circuit can perform a reset operation through its output voltage. This reset operation is described in more detail below.

Figure 2:
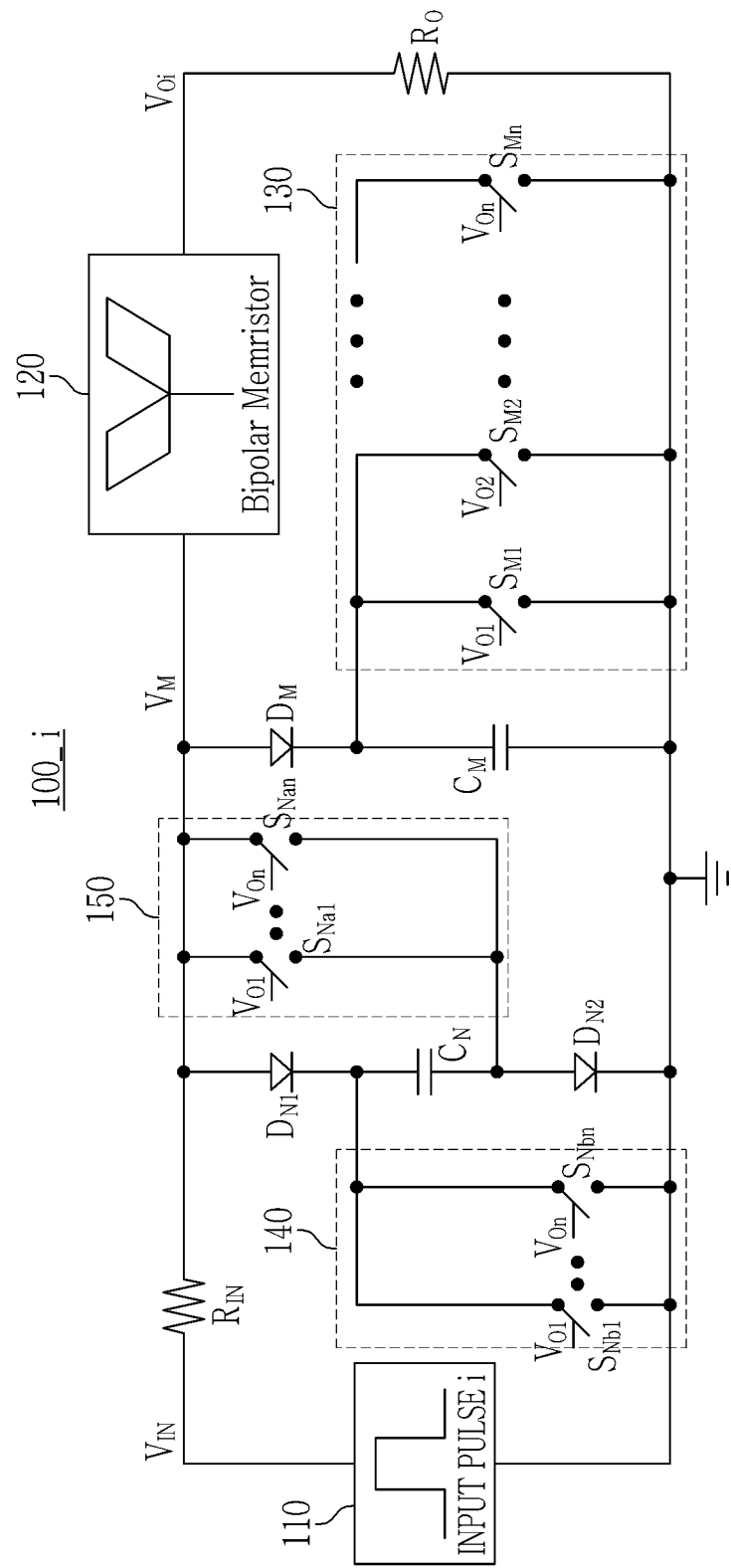
FIG. 2 is a diagram showing a neuron circuit according to an exemplary embodiment of the present invention.

FIG. 2 is a diagram showing a neuron circuit according to an exemplary embodiment of the present invention. That is, the neuron circuit 100_i of FIG. 2 shows the i-th neuron circuit of FIG. 1. Each of the plurality of neuron circuits 100_1 to 100_n of FIG. 1 may have a neuron circuit structure as shown in FIG. 2.

As shown in FIG. 2, the neuron circuit 100_i includes an input unit 110, an input resistor RIN, a bipolar memristor 120, a capacitor CM, an output resistor RO, a capacitor CN, a diode DM, a diode DN1, a diode DN2, a first switch group 130, a second switch group 140, and a third switch group 150.

The input pulse i described with reference to FIG. 1 is applied to the input unit 110. That is, the input pulse i is applied to the input unit 110. When the neuron circuit 100_i is fired, the input pulse i has a pulse voltage of a predetermined frequency.

One end of the input resistor RIN is connected to one end of the input unit 110, and the other end of the input resistor RIN is connected to one end of the bipolar memristor 120. The output resistor RO is connected between the other end of the bipolar memristor 120 and the other end of the input unit 110. Here, a voltage across the output resistor RO is the output voltage Voi of the neuron circuit 100_i.

The bipolar memristor 120 may be a ferroelectric ultra-thin bipolar memristor. The bipolar memristor 120 has a positive threshold voltage Vth2 but a negative threshold voltage Vth1, unlike a unipolar memristor where two threshold voltages are positive.

Figure 3:
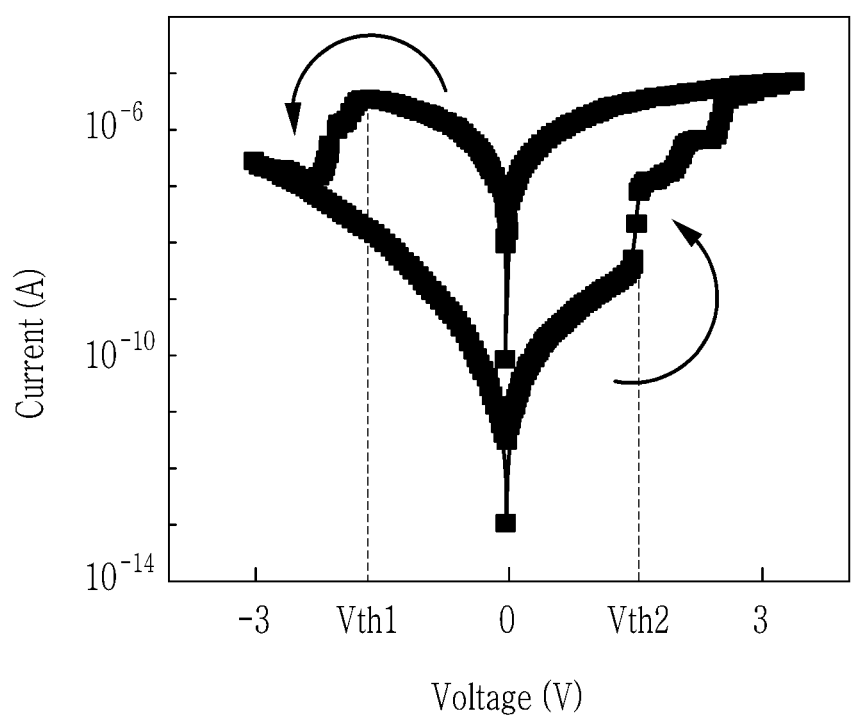
FIG. 3 is a diagram showing voltage-current characteristics of the bipolar memristor according to an exemplary embodiment of the present invention.

FIG. 3 is a diagram showing the voltage-current characteristics of the bipolar memristor 120 according to an exemplary embodiment of the present invention.

As shown in FIG. 3, in the bipolar memristor 120 according to an exemplary embodiment of the present invention, the current gradually rises with the voltage up to the positive threshold voltage Vth2, and then the current rapidly rises above the positive threshold voltage Vth2. That is, above the positive threshold voltage Vth2, a resistance value of the bipolar memristor 120 greatly increases and fires. On the other hand, in the bipolar memristor 120, the current rapidly decreases below the negative threshold voltage Vth1. That is, the bipolar memristor 120 is in a state capable of being reset at the negative threshold voltage Vth1. When a voltage below the negative threshold voltage Vth1 is applied, the current decreases sharply, so that the bipolar memristor 120 is set to a state that can be reset (initialized). The magnitude (absolute value) of the positive threshold voltage Vth2 may be equal to or greater than the magnitude (absolute value) of the negative threshold voltage Vth1. That is, |Vth2|≥|Vth1|. The threshold voltages Vth1 and Vth2 may be adjusted by the setting of the internal material of the bipolar memristor 120, which can be understood by those skilled in the art to which the present invention pertains, so a detailed description thereof will be omitted. The neuron circuits 100_1 to 100_n according to the embodiment of the present invention have a structure in which a voltage below the negative threshold voltage Vth1 may be applied so that a reset operation may be performed after a predetermined neuron circuit is fired.

An anode of the diode DM is connected to one end of the bipolar memristor 120, and the capacitor CM is connected between a cathode of the diode DM and a ground. In FIG. 2, a voltage of the anode of the diode DM (i.e., a voltage of one end of the bipolar memristor 120) is represented by VM. When an input pulse is applied to the input unit 110, a voltage is charged in the capacitor CM, and the VM voltage is increased.

An anode of the diode DN1 is connected to one end of the bipolar memristor 120, one end of the capacitor CN is connected to a cathode of the diode DN1, and the diode DN2 is connected between the other end of the capacitor CN and the ground. When an input pulse is applied to the input unit 110, a voltage is charged in the capacitor CN, and the VM voltage is increased.

When an input pulse is applied to the input unit 110, the capacitors CM and CM are charged, and the VM voltage is increased. When the VM voltage rises to reach the positive threshold voltage Vth2 of the bipolar memristor 120, a resistance of the bipolar memristor 120 becomes very small. Accordingly, the output voltage Voi becomes a spike voltage.

The first switch group 130 includes a plurality of switches SM1, SM2, ..., SMn, and each of the plurality of switches SM1, SM2, ..., SMn is connected in parallel to the capacitor CM. Here, the number of the switches SM1, SM2, ..., SMn may be n-1 (n is a natural number of 2 or more). The plurality of switches SM1, SM2, ..., SMn are controlled by the output voltages Vo1, Vo2, ..., Von described in FIG. 1. The neuron circuit 100_i receives the output voltages of the neuron circuits other than its own output voltage Voi, and the feedback voltages are applied to the plurality of switches SM1, SM2, ..., SMn, respectively. That is, when the neuron circuit 100_i is fired, the first switch group 130 is turned off. When at least one neuron circuit of the remaining neuron circuits other than the neuron circuit 100_i is fired, the first switch group 130 is turned on.

The second switch group 140 includes a plurality of switches SNb1, SNb2, ..., SNbn, and each of the plurality of switches SNb1, SNb2, ..., SNbn is connected in parallel between one end of the capacitor CN and the ground. Here, the number of the switches SNb1, SNb2, ..., SNbn may be n-1 (n is a natural number of 2 or more). The plurality of switches SNb1, SNb2, SNbn are controlled by the output voltages Vo1, Vo2, ..., Von described in FIG. 1. The neuron circuit 100_i receives the output voltages of the neuron circuits other than its own output voltage Voi, and the feedback voltages are applied to the plurality of switches SNb1, SNb2, ..., SNbn, respectively. That is, when the neuron circuit 100_i is fired, the second switch group 140 is turned off. When at least one neuron circuit of the remaining neuron circuits other than the neuron circuit 100_i is fired, the second switch group 140 is turned on.

The third switch group 140 includes a plurality of switches SNa1, SNa2, ..., SNan, and each of the plurality of switches SNa1, SNa2, ..., SNan is connected in parallel between the anode of the diode DN1 and the other end of the capacitor CN. Here, the number of the switches SNa1, SNa2, ..., SNan may be n-1 (n is a natural number of 2 or more). The plurality of switches SNa1, SNa2, ..., SNan are controlled by the output voltages Vo1, Vo2, ..., Von described in FIG. 1. The neuron circuit 100_i receives the output voltages of the neuron circuits other than its own output voltage Voi, and the feedback voltages are applied to the plurality of switches SNa1, SNa2, ..., SNan, respectively. That is, when the neuron circuit 100_i is fired, the third switch group 150 is turned off. When at least one neuron circuit of the remaining neuron circuits other than the neuron circuit 100_i is fired, the third switch group 130 is turned on.

When at least one neuron circuit of the remaining neuron circuits other than the neuron circuit 100_i is fired, the first to third switch groups 130, 140, and 150 are turned on, so that the reset operation of the neuron circuit 100_i is automatically performed.

Hereinafter, a method of operating a neuron circuit according to an exemplary embodiment of the present invention will be described with reference to FIGS. 4 and 5.

Figure 4:
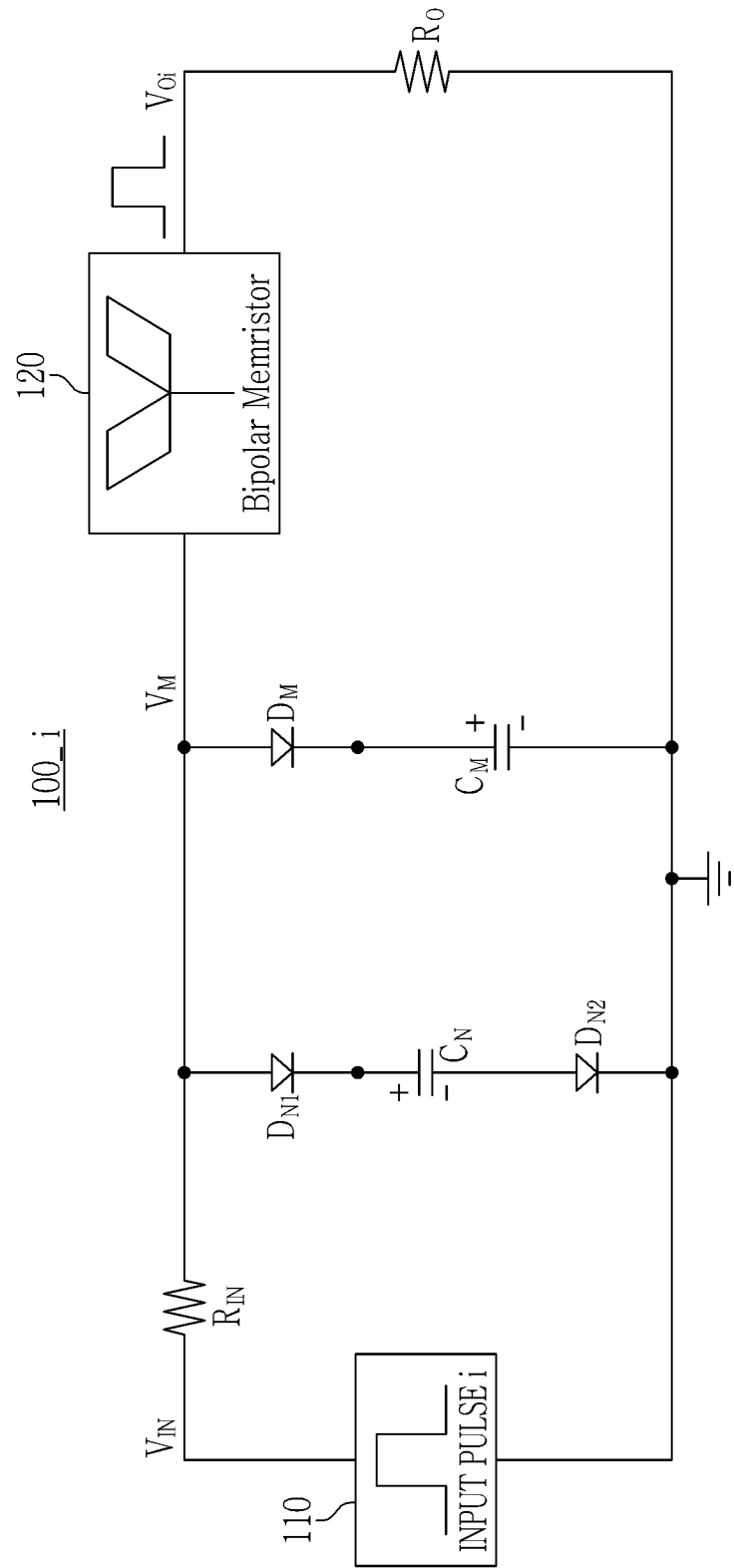
FIG. 4 is a diagram showing a state of a neuron circuit to be fired according to an embodiment of the present invention.

FIG. 4 is a diagram showing a state of a neuron circuit to be fired according to an embodiment of the present invention. That is, FIG. 4 is a diagram showing the state of the i-th neuron circuit 100_i to be fired.

When the first to third switch groups 120, 130, and 140 are turned off, the circuit of FIG. 3 becomes an equivalent circuit as shown in FIG. 4.

When an input pulse is applied to the input unit 110, the capacitor CM and the capacitor CN perform a charging operation, and accordingly, the VM voltage gradually increases. When the VM voltage rises to become the positive threshold voltage Vth2, the resistance of the bipolar memristor 120 becomes very low as described with reference to FIG. 3. As a result, the output voltage Voi becomes a spike voltage and becomes high. This output voltage Voi is fed back to the remaining neuron circuits except the i-th neuron circuit 100_i.

Figure 5:
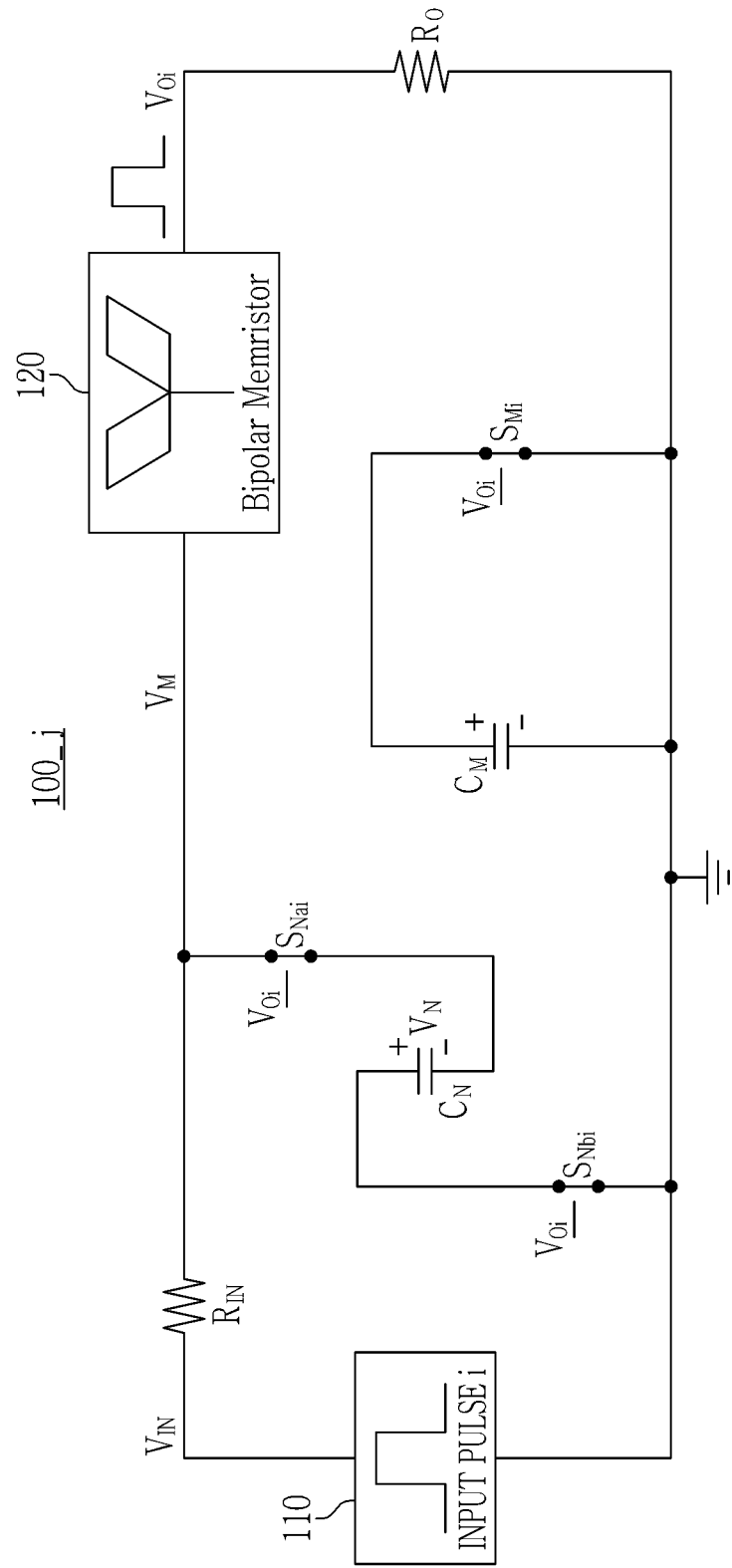
FIG. 5 is a diagram showing a state of a j-th neuron circuit immediately after the fire of an i-th neuron circuit according to an exemplary embodiment of the present invention.

FIG. 5 is a diagram showing a state of the j-th neuron circuit 100_j immediately after the firing of the i-th neuron circuit 100_i according to an exemplary embodiment of the present invention. Here, it is assumed that the j-th neuron circuit 100_j is a non-fired neuron circuit.

In the j-th neuron circuit 100_j, since the VM voltage does not become a positive threshold voltage Vth2, the bipolar memristor 120 is not fired. However, the capacitor CM and the capacitor CN are also charged by the input pulse applied to the input unit 110. Here, a voltage charged in the capacitor CN is denoted as VN.

When the i-th neuron circuit 100_i is fired and the output voltage Vo is set to a high state, the first to third switch groups 130, 140, and 150 included in the j-th neuron circuit 100_j are turned on. Since the output voltage Voi is in the high state, the switches SMi, SNbi, and SNai controlled by the output voltage Voi are turned on. That is, the j-th neuron circuit 100_j becomes an equivalent circuit as shown in FIG. 5.

The switch SNbi and the switch SNai are turned on, so that a reverse voltage is applied to the diodes DN1 and DN2. Since the voltage VN charged across the capacitor CN does not change, the VM voltage becomes a negative voltage. A negative voltage is applied to the bipolar memristor 120 so that the bipolar memristor 120 is in a state capable of being reset. Here, the voltage VN charged at both ends of the capacitor CN may be set to Vth1 by the circuit design. That is, when the neuron circuit according to the exemplary embodiment of the present invention is not fired itself, a negative voltage is applied to the bipolar memristor 120 to perform a reset operation.

Meanwhile, a reverse voltage is applied to the diode DM by turning on the switch SMi, and both ends of the capacitor CM are connected to the ground. Accordingly, the capacitor CM may be discharged and reset.

The neuron circuit according to the exemplary embodiment of the present invention has a structure in which a negative threshold voltage can be applied to the bipolar memristor. Through this, according to the exemplary embodiment of the present invention, the non-fired neuron circuit may automatically perform a reset operation by receiving feedback of the output voltage of the fired neuron circuit.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. A neuron circuit comprising:
an input unit to which an input pulse is applied;
a bipolar memristor configured to have one end connected to one end of the input unit;
a first capacitor configured to be connected between the one end of the bipolar memristor and a ground;
a first diode configured to have an anode connected to the one end of the bipolar memristor;
a second capacitor configured to have one end connected to a cathode of the first diode;
a first switch configured to be connected between the one end of the second capacitor and the ground;
a second switch configured to be connected between the anode of the first diode and another end of the second capacitor;
a second diode configured to have an anode and a cathode connected between the other end of the second capacitor and the ground, respectively; and
a second plurality of switches connected in parallel between the anode of the second diode and the anode of the first diode;
wherein the first switch is one of a first plurality of switches connected in parallel between the one end of the second capacitor and the ground.

2. The neuron circuit of claim 1, further comprising
a second diode configured to have an anode and a cathode connected between the other end of the second capacitor and the ground, respectively.

3. The neuron circuit of claim 1, further comprising
a third switch configured to be connected in parallel to one end and another end of the first capacitor.

4. The neuron circuit of claim 3, further comprising
a third diode configured to have an anode and a cathode connected to the one end of the bipolar memristor and the one end of the first capacitor, respectively.

5. The neuron circuit of claim 1, wherein
the first switch and the second switch are turned on in a reset operation of the neuron circuit.

6. The neuron circuit of claim 5, wherein
a negative voltage is applied to the bipolar memristor in the reset operation.

7. The neuron circuit of claim 3, wherein
the first to third switches are turned off before the neuron circuit is fired.

8. The neuron circuit of claim 1, wherein
the first capacitor and the second capacitor are charged by the input pulse, and a negative voltage is applied to the bipolar memristor by turning on the first and second switches in a reset operation of the neuron circuit.

9. The neuron circuit of claim 1, wherein
the bipolar memristor has a positive threshold voltage and a negative threshold voltage.

10. An operating method of a neuron circuit including a bipolar memristor, the operating method comprising:
providing a charging voltage of a first capacitor to the bipolar memristor by charging the first capacitor, the first capacitor being connected to one end of the bipolar memristor;
providing a voltage at one end of a second capacitor to the bipolar memristor by charging the second capacitor, the second capacitor having one end connected to the one end of the bipolar memristor; and providing a voltage at another end of the second capacitor to the bipolar memristor in a reset operation, wherein the neuron circuit further includes
- a first diode configured to have an anode connected to the one end of the bipolar memristor,
- a second diode configured to have an anode and a cathode connected between the other end of the second capacitor and a ground, respectively,
- a first switch connected between the one end of the second capacitor and a ground and
- a second plurality of switches connected in parallel between the anode of the second diode and the anode of the first diode, and wherein the first switch is one of a first plurality of switches connected in parallel between the one end of the second capacitor and the ground.

11. The operating method of claim 10, wherein the providing of the voltage at the other end of the second capacitor includes:
turning on the first switch; and
turning on a second switch connected between the other end of the second capacitor and the one end of the bipolar memristor.

12. The operating method of claim 10, further comprising discharging a voltage charged in the first capacitor by turning on a switch connected in parallel to the first capacitor in the reset operation.

13. The operating method of claim 10, wherein a voltage at the one end of the second capacitor is a positive voltage and a voltage at the other end of the second capacitor is a negative voltage.

14. The operating method of claim 10, wherein the bipolar memristor has a positive threshold voltage and a negative threshold voltage.

15. A neuron circuit system comprising:
a first neuron circuit configured to output a first output voltage upon firing; and
a second neuron circuit configured to receive feedback from the first output voltage and perform a reset operation, wherein the second neuron circuit includes:
a bipolar memristor;
a first capacitor configured to be connected to one end of the bipolar memristor and charged by an input pulse;
a second capacitor configured to have one end connected to the one end of the bipolar memristor and be charged by the input pulse;
a first switch configured to be connected between one end of the second capacitor and a ground and be turned on by the first output voltage;
a second switch configured to be connected between the one end of the bipolar memristor and another end of the second capacitor and be turned on by the first output voltage;
a first diode configured to have an anode connected to the one end of the bipolar memristor and a cathode connected to the one end of the second capacitor;
a second diode configured to have an anode connected to the other end of the second capacitor and a cathode connected to the ground; and
a second plurality of switches connected in parallel between the anode of the second diode and the anode of the first diode;

wherein the first switch is one of a first plurality of switches connected in parallel between the one end of the second capacitor and the ground.

16. The neuron circuit system of claim 15, wherein in the reset operation, the first and second switches are turned on, and the second capacitor provides a negative voltage to the bipolar memristor.

17. The neuron circuit system of claim 15, wherein the second neuron circuit further includes a third switch connected in parallel to the first capacitor and turned on by the first output voltage.

* * * * *